United States Patent [19]

Alhäuser

[11] Patent Number: 4,578,187

[45] Date of Patent: Mar. 25, 1986

[54] ION EXCHANGE APPARATUS TO IMPROVE THE QUALITY OF POTABLE WATER

[76] Inventor: Erich Alhäuser, Am Hözebert 2, 5412 Ransbach-Baumbach, Fed. Rep. of Germany

[21] Appl. No.: 625,959

[22] Filed: Jun. 29, 1984

[51] Int. Cl.[4] ............................................. C02F 1/42
[52] U.S. Cl. ..................... 210/93; 210/266; 210/282; 210/286
[58] Field of Search .............. 210/266, 281, 282, 286, 210/436, 472, 482, 85, 93, 96.1

[56] References Cited

U.S. PATENT DOCUMENTS

| | | | |
|---|---|---|---|
| 2,381,354 | 8/1945 | Larson | 210/286 |
| 3,392,837 | 7/1968 | Sanzenbacher | 210/282 |
| 3,715,035 | 2/1973 | Teeple et al. | 210/282 |
| 4,298,475 | 11/1981 | Gartner | 210/266 |
| 4,382,862 | 5/1983 | Dillman | 210/282 |

Primary Examiner—Ivars Cintins
Attorney, Agent, or Firm—Larson and Taylor

[57] ABSTRACT

An apparatus for improving the quality of potable water. A housing receives a replacable cartridge having an ion exchange and a bacteriostatically effective material. The cartridge is an essentially closed upright container. Partition walls divide the container into a first chamber having an inlet from which the flow is downward and a second chamber through which the flow is upward leading to a discharge opening. The inlet opening of the cartridge is higher than the discharge opening and both openings have particle filters. The second chamber extends up beyond the level of the inlet opening and is ventilated at the top. A vertical pipe inside the housing is sealingly attached at the discharge opening of the cartridge. This vertical pipe opening has its top end below the inlet opening and the vertical pipe opens with its top end below the inlet opening into a discharge passage.

15 Claims, 1 Drawing Figure

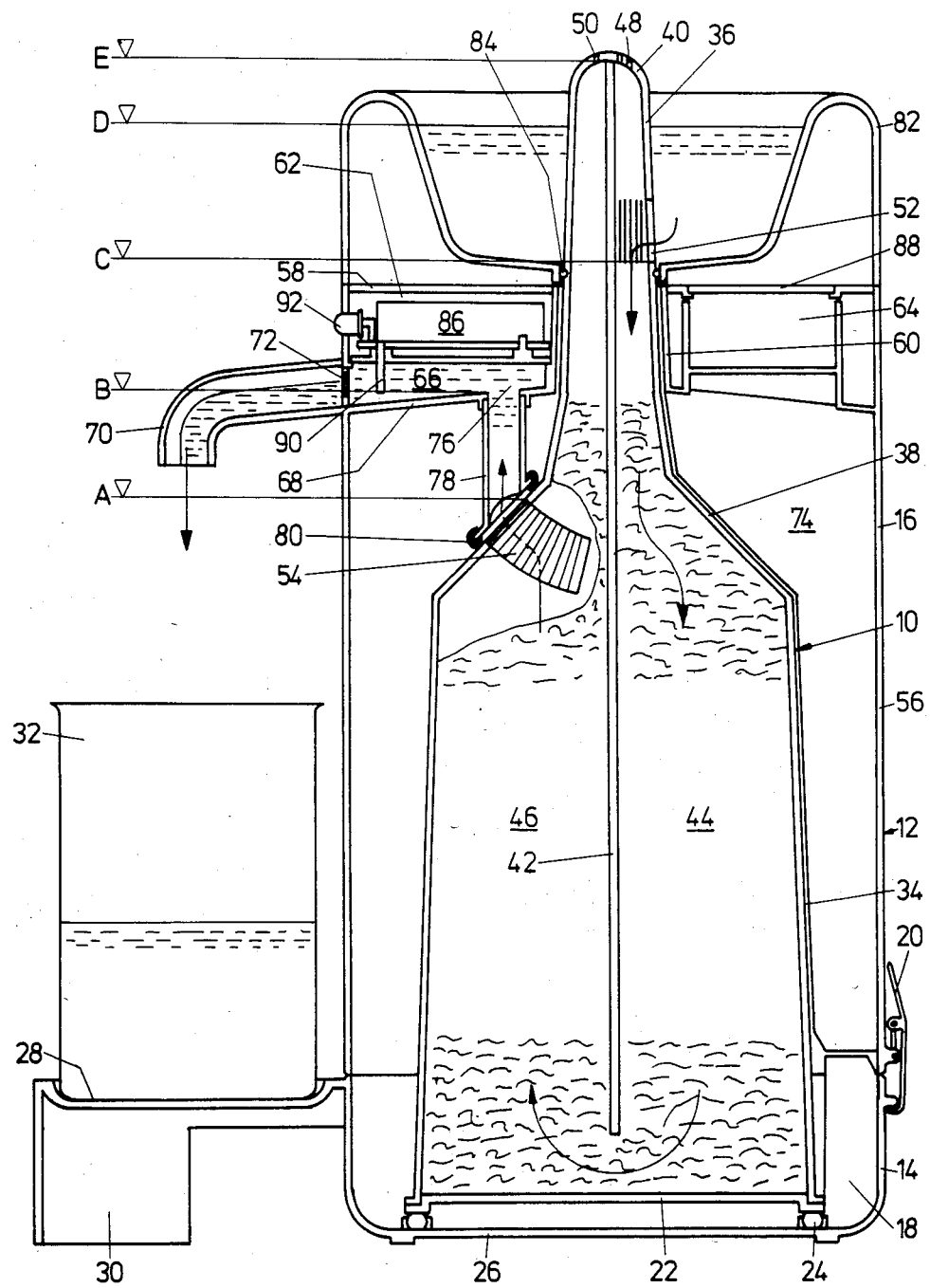

ION EXCHANGE APPARATUS TO IMPROVE THE QUALITY OF POTABLE WATER

The invention relates to an apparatus for the improvement of the quality of potable water, with a housing, in which is carried a replaceable cartridge containing at least one ion exchanger as well as a material with at least a bacteriostatic effect such as particularly silver in dissociable form.

Apparatuses of this type with a cartridge containing an ion exchange material are known for example from German patent documents DE-AS 27 52 581 and DE-OS 30 08 208. Furthermore it is known from German patent document DE-OS 26 56 465 in addition to the ion exchange material to include silver in dossociable state in the cartridge, in order to prevent the growth of germs on the ion exchange material, and, insofar as possible, beyond that to lower the germ count in the water contained therein.

All known apparatuses are stipulated for connection to a water pipe system and thus work under the pressure prevailing in the water pipe system. In many cases however such dependence on the water is undesirable on account of the requirements of a permanent or temporary connection to the water line. This for example is the case in the preparation of dry food, particularly for infants in the home, where such a connection to the water line either is not at all possible or is at least perceived as burdensome or complicated.

Rather than that, it is desirable to have an apparatus independent of the water system, which by filling the desired volume of water into a filling opening supplies a corresponding volume of water of improved quality at its outlet. As a result, however, the danger of germ contamination of the ion exchange material exists to a great measure when the apparatus is not working. The drying out of the ion exchange material so that the bacteriostatically effective material cannot work must be especially avoided during long periods of nonuse. Furthermore it must be guaranteed that no bacteria or other noxious material can get through to the exchange material by backing up through the outlet to multiply there where the water is drawn for the next use.

Therefore the object of the invention is to construct an apparatus of the aforementioned type so that it can be used independent of the water system with consideration for the present requirements.

This is attained according to the invention by the combination of the following features:

(a) the cartridge is formed as an essentially closed upright container and is divided by a partition wall ending at some distance above the container bottom into a first chamber provided with an inlet from which the flow is downward in the said first chamber and a second chamber through which the flow is upward and leading to a discharge opening, (b) the inlet opening of the cartridge is considerably higher than the discharge opening, (c) the inlet opening and the discharge opening of the cartridge are provided with particle filters, (d) at least the second chamber of the cartridge is extended upward beyond the level of the inlet opening, outward and upward and is ventilated at the top end, (e) a filling funnel is arranged to be tightly attached at the inlet opening of the cartridge, the top edge of said opening being situated considerably lower than the ventilation slots, and (f) a vertical pipe is arranged on the inside of the housing to be sealingly attached at the discharge opening of the cartridge, the said vertical pipe opening with its top end below the inlet opening into a discharge passage configured with an inclination to its free end.

By the division of the cartridge into a first chamber through which the flow is downward, and a second chamber through which the flow is upward, it is assured that the ion exchange filling remains continually under water and cannot dry out. Thus the bacteriostatically effective material can also deploy its complete effect and prevent the multiplication of germs in the ion exchange filling. Self-acting discharge of the apparatus is prevented during normal use, i.e. as long as the apparatus is not deliberately tilted.

The configuration of the apparatus according to the invention leads to a total of five characteristic levels differing from each other, which are of particular importance for the operation of such an apparatus, and they are, from the bottom upward, the level of the discharge opening of the cartridge,
the level of the top end of the vertical pipe,
the level of the inlet opening,
the level of the top edge of the funnel, and
the level of the ventilation point at least of the second chamber of the cartridge.

Thus some notable operations of the apparatus according to the invention are attained in connection with the inclination of the discharge passage for the independence of the water system:

During filling of the apparatus, a water gauge is set within the cartridge at the level of the top end of the vertical pipe, which in turn contains water with the bacteriostatically effective material. This gauging is made possible in the second chamber by the ventilation at the top;

with the ventilation of the second chamber germs which come into the cartridge are exterminated by the bacteriostatically effective material in the water, before they can get to the discharge from the cartridge which is located by the length of vertical pipe under the water gauge;

the discharge passage configured with an inclination discharges following overflow and also following each individual use of the apparatus until it is empty and dry, to prevent great germ collections within the passage;

germs which nevertheless get into vertical pipe are there being exterminated by the bacteriostatically effective material in the water;

with each separate use of the apparatus the water level in the second chamber may rise to the maximum at the top edge of the funnel as a result of the ventilation, then lower again to the level of the top end of the vertical pipe. Germs, which are drawn in during this lowering through the ventilation port are exterminated in the above described manner by the bacteriostatically effective material in the water, before they can get to the discharge opening of the cartridge.

The apparatus according to the invention can thus be operated intermittently, without danger of germ multiplication, without requiring special cleaning measures following each use. If the cartridge is depleted, it is exchanged and the apparatus is filled with water again in the above described manner.

The cartridge can be filled with a cation exchanger or an anion exchanger. To improve the quallity of the potable water, particularly as required for the preparation of dry food for infants, however, it is especially advantageous to fill the cartridge with a mixed bed, consisting of an anion exchanger, a cation exchanger, and a silvered cation exchanger.

Features for advantageous construction of the apparatus according to the invention arise in the following description of one especially advantageous embodiment shown in vertical cross section in the drawing.

The apparatus which is shown consists mainly of a bottle-like cartridge 10, which is exchangeably mounted in an essentially cylindrical housing indicated in its entirety by the numeral 12.

In the example the housing is divided into a comparatively low bottom part 14 and a top part 16 which in a joined state are centered relative to each other by suitable means such as for example several radial ribs 18 distributed inside the housing cover and projecting upward, and braced relative to each other by detachable fastening means such as for example two or more clamps 20. Radial ribs 18 provide also for centering of cartridge 10, which rests with its bottom 22 on an elastic ring 24 on the housing bottom 26.

On the outside of housing bottom 14 there is provided a support 30 having a recess for receiving a collecting vessel 32 for the water to be treated.

The shape of the covering of cartridge 10 is, according to the above mentioned bottle shape, comprised by a body section 34, a neck section 36 and a conical transition section 38 connecting sections 34 and 36. Neck section 36 ends at the top in a spherical end part 40, from which a partition wall 42 extends downward transversally through the cartridge, and ends with formation of a horizontal edge at some distance above cartridge bottom 22. Therefore the inside of the cartridge is divided in the area of partition wall 42 into two chambers 44, 46, which are connected with each other below partition wall 42. Chambers 44, 46 are ventilated at the top in a spherical of the neck through narrow ventilation slots 48, 50 in end part 40. Chamber 44 is furthermore provided with an inlet opening 52 in the area of neck section 36 of the cartridge, formed by a number of narrow vertical slots, which operate as a particle filter. The other chamber 46 has a discharge opening 54 in the transition section 38 between the body section and the neck section, which discharge opening is likewise configured of a number of vertical slots with the effect of a particle filter. These slots are adjacent to each other in such a manner that they are at the highest in the middle of discharge opening 54 and drop progressively lower on both sides.

Cartridge 10 is filled with ion exchange material, preferably 9 granulate of ion exchange resin and contains an at least bacteriostatically effective material such as dissociated silver. The filling is preferably a mixed bed of pure cation resins, pure anion resins and an additional portion of silvered cation resins, distributed uniformly within the entire filling. The filling level is above discharge opening 54 and is preferably in the lower part of neck section 36.

Housing top part 16 consists mainly of a cylindrical covering wall 56 and a flat top wall 58 with a central opening for neck section 36 of cartridge 10, from which a collar-like annular part 60 extends downward. An apparatus chamber 62, a battery chamber 64, and a discharge passage 66, with a bottom 68 which drops radially outward, are distributed by means of a system of other partitions within housing top part 16 between collar-like annular part 60 and covering wall 56. A discharge spout 60 which curves downward is attached to discharge passage 66 on the outside of covering wall 56 of housing part 16, the discharge spout 70 opening in the center over collecting vessel 32. The connection between discharge passage 66 and discharge spout 70 is obstructed in the middle by a transverse wall 72, referred to as a baffle plate, under and over which narrow passages for water and air are provided.

Beneath the aforementioned chambers, housing top part 16 the same as housing bottom part 14 is provided with several radial ribs 74 around the periphery, which end at some distance from the bottom edge of covering wall 56 and are fitted with their inside edges to the contour of cartridge 10. Radial ribs 74 of housing top part 16 are advantageously aligned with radial ribs 18 of housing bottom part 14, and such a pair of ribs can be flared radially inward to guarantee the alignment of both housing parts 14, 16 with the cartridge relative to the angular setting of these parts relative to each other by engagement in a groove running down from the top in the covering wall of cartridge 10.

Discharge passage 66 has an opening 76 on the bottom 68 provided with a collar, into which is fitted a vertical pipe 78 directed downward which is permanently fastened by an adhesive or another measure. Vertical pipe 78 is flared at its lower end, carefully avoiding horizontal wall parts, to cover discharge opening 54 of cartridge 10 over its total cross section and when it is assembled to tighten against the walls of the cartridge 10 by a surrounding seal 80 mounted at the edge of the pipe opening. Thus, the non-flared area of vertical pipe 78 is found directly over the middle and, as aforementioned, at the level of the highest slots of discharge opening 54.

On top closure wall 58 of housing top part 16 is mounted an angularly symmetrical funnel 82, having aperture with a sealing ring 84 in the center, and in the assembled state the aperture closely adapts to neck section 36 of cartridge 10 passing therethrough. The slots forming inlet opening 52 of cartridge 10 when the device is assembled end directly over sealing ring 84, so that water fed into funnel 82 may be almost completely discharged from funnel 82 into cartridge 10.

An electric conductance measuring device 86 shown diagrammatically is provided in chamber 62 and supplied with electrical power by a battery (not shown) in battery chamber 64. The battery can be inserted into battery chamber 64 through an opening in top wall 58 which can be closed with a cover 88, thereby the battery clamps coming into conductive connection with contacts (not shown). Two electrodes projecting downwardly from the conductance measure device, one of the electrodes mounted behind the other in the plane of the drawing, so that only one electrode 90 is visible, project into discharge passage 66 shortly above its curved bottom 68. The conductance measuring device is configured in a known manner so that it is disconnected when discharge passage 66 is empty in order to save energy and is automatically connected when both electrodes are circumcirculated by water. Two signal lamps are arranged one after the other on the outside wall of chamber 62, of which only one, 92, is visible in the drawing. One of the two signal lamps, which for example produces green or white light, is illuminated when the conductance measuring device is connected and signals its readiness for use. The other signal lamp, which for example produces red light is illuminated, when the measured conductance exceeds the allowable limit, thus indicating that the cartridge is depleted and must be changed. Both signal lamps can advantageously be illuminated diodes.

The present description of the construction of the apparatus shows five characteristic levels, which are marked in the drawing by letters A, B, C, D and E, and of which the meaning can be ascertained from the following description of the method of operation of the apparatus. These levels are the following:

A = highest point of discharge opening 54
B = top edge of vertical pipe 78,
C = lowest point of inlet opening 52,
D = top edge of funnel 82,
E = ventilation slots 48, 50 of chambers 44 and 46 of cartridge 10.

The described apparatus operates as follows:

It is assumed that an operational battery is set in battery chamber 64 and housing 12 is opened by removal of funnel 82 and top part 16. After insertion of a cartridge 10 in the correct angular position in housing bottom part 14 housing top part 16 is set in corresponding angular position and is held tighly by means of the clamps 20 on housing bottom part 14. Thereby, the elastic ring 24 works on housing bottom 26, so that the transition section 38 of covering wall of the cartridge is braced against radial ribs 74 of housing top part 16 and is braced simultaneously in the area of discharge opening 54 against sealing ring 80 on the flared bottom end of vertical pipe 78 resulting in a sealed connection at this point.

Then funnel 82 is forced onto neck section 36 of cartridge 10 until it rests on top wall 58 of housing top part 16, and collecting vessel 32 is set on support 30. The apparatus is thus ready for operation.

To obtain treated water, however, the cartridge must be filled by repeated pouring of water into funnel 82 up to level B. During filling the ventilation slots 48, 50 in the end 40 of cartridge wall 10 provide for escaping air from both chambers 44, 46, and from chamber 46 even when the water therein has already reached level A. As soon as the water level has risen to level B, water begins to flow through discharge passage 66 and discharge spout 70 into collecting vessel 32. Since the water being discharged has passed through the entire ion exchange filling of cartridge 10, its quality has been improved to the desired point, i.e. according to the type of ion exchanger used, e.g. hs been desalted and freed of heavy metal ions. The material in the cartridge, such as dissociable silver, will simultaneously provide that germs do not multiply int he apparatus. However it may be advantageous not to continue to use this water being discharged during the last filling of the funnel 82, as authorized, but rather to discard it.

With each subsequent pouring of a certain volume of water into funnel 82 then the corresponding volume of treated water will flow out into collecting vessel 32. Since the water passage through the cartridge is severely limited by the ion exchange filling, no turbulences occur within the cartridge, and the water flows through the cartridge without disturbing the layering which is present when it is at rest, so that the water flowing through the cartridge is guaranteed to be subject to uniform treatment.

When fresh water is poured into funnel 82, first the water gauges in chamber 44 and then also in chamber 46 rise to the level of the water level in funnel 82. Futhermore, also discharge passage 66 will be increasingly filled because of the resistance provided by baffle plate 72 against the downward flowing water, and the air in discharge passage 66 may flow out through the opening over baffle plate 72 into discharge spout 70. Thus the electrodes 90 of conductance measuring device 86 are circumcirculated by treated water, and conductance measuring device 86 is activated which is indicated by illumination of signal lamp 92.

During discharge of the treated water into collecting vessel 32 delayed by the inside resistance of cartridge 10 and baffle plate 72, the water levels in funnel 82 and chambers 44, 46 drop, with the result that air is drawn into chambers 44, 46 from the environment through ventilation slots 48, 50. Bacteria (germs) can thus get into chambers 44, 46. This is of little importance to chamber 44, since it is in connection with the environmental air following the drop of the water level in the cartridge. Bacteria which are thus drawn into chamber 46 cannot get to discharge opening 54, since the water in chamber 46 cannot drop below level B and thus these bacteria are exterminated by the dissolved silver of the water standing above level A up to level B. If desired, for further reduction of the germ count, ventilation slot 50 of chamber 46 can be provided with a bacteria filter, of which the air flowthrough ability thus continues to guarantee that the level E of this ventilation slot remains above level D of the top funnel edge and thus such a bacteria filter always remains in dry operation. Finally when the entirely treated water is discharged from funnel 82 down into the cartridge and the water gauge has dropped to level B in chambers 44, 46, the discharge of treated water into collecting vessel 32 is stopped and discharge passage 66 and discharge spout 70 dry out until the next use of the apparatus. This avoids any multiplication of bacteria at these points. The water standing up to the top edge of vertical pipe 78 contains a sufficient quantity of dissociated silver that germ development therein is excluded. The apparatus is thus always ready for operation for the treatment of another volume of water following a desired rest time.

When the ion change material in cartridge 10 has lost its efficacy, conductance measuring device 86 during the next use of the apparatus will indicate this state by the suitable signal lamp 92, so that the user of the apparatus can reconstitute operation readiness by changing the cartridge and refilling the apparatus in the aforementioned manner.

As shown in the exemplary embodiment, the invention provides an apparatus which is independent from the water system and—with a battery-fed conductance measuring apparatus—also from the power system, which however can be operated without error by unskilled persons, particularly housewives and mothers, with simple observation of the indication of the signal lamps. The apparatus is simple to dismantle. The removable funnel especially allows rapid and thorough cleaning. Likewise, with suitable construction, the discharge spout can also be removable for cleaning, and funnel and discharge can be combined into one single structural part.

I claim:

1. Apparatus for the improvemnt of the quality of potable water, with a housing, in which is received a replaceable cartridge, an ion exchange and a bacteriostatically effective material, characterized by the combination of the following features:
   (a) the cartridge (10) is formed as an essentially closed upright container and is divided by a partition wall (42) ending at some distance above the container bottom (22) into a first chamber (44) provided with an inlet from which the flow is downward in the said first chamber (44) and a second chamber (46) through which the flow is upward and leading to a discharge opening (54), (b) the inlet opening (52) of the cartridge (10) is substantially higher than discharge opening (54), (c) the inlet opening (52) and discharge opening (54) of the cartridge (10) are provided with particle filters, (d) at least the second chamber (46) of the cartridge (10) is extended upward beyond the level of inlet opening (52) outward and upward and is ventilated at the top end through ventilation slots (48,50), (e) a filling funnel (82) is arranged to be tightly attached at the inlet opening (52) of the cartridge (10), the top edge of said opening being substantially lower than the ventilation slots (48, 50), and (f) a vertical pipe (78) is arranged on the inside of the housing to be sealingly attached at the discharge opening (54) of the cartridge (10), the said vertical pipe (78) opening with its top end below the inlet opening (52) into a discharge passage (66) configured with inclination to its free end.

2. Apparatus as in claim 1, characterized in that the outside wall (34, 36, 38) of cartridge (10) is constructed essentially axially symmetrically.

3. Apparatus as in claim 2, characterized in that partition wall (42) runs down axis of cartridge (10).

4. Apparatus as in claim 2, characterized in that cartridge (10) is in the shape of a bottle.

5. Apparatus as in claim 4, characterized in that discharge opening (54) is in a conical changeover section (38) of the covering wall of cartridge (10) between the bottle body (34) and the bottle neck (36).

6. Apparatus as in claim 5, characterized in that discharge opening (54) has a peripherally widened transverse extension, and the top limiting edge of the discharge opening drops from a highest point down on at least one side, and in that vertical pipe (78) is continually widening at its lower part to the discharge opening (54).

7. Apparatus as in one of claims 4 to 6, characterized in that funnel (82) has a central aperture by which it is fitted with a sealing means to the neck section (36) of the covering wall of the cartridge (10), and in that the inlet opening (52) is arranged on neck section (36) immediately above the aperture.

8. Apparatus as in claim 7, characterized in that the funnel (82) is configured as a separate structural part which is removable from the housing top part (16).

9. Apparatus as in claim 7, characterized in that the funnel (82) and the housing (12) which carries the cartridge (10) are essentially angularly symmetrical and are fitted to each other on the outside.

10. Apparatus as in claim 1, characterized in that the housing (12) is divided into two separate parts and means (20) are provided for clamping the two housing parts with each other.

11. Apparatus as in claim 10, characterized in that the divisional plane between the two housing parts runs horizontally.

12. Apparatus as in claim 1, characterized in that at least a part of the discharge passage (66) is constructed of one integral piece with the housing (12) and the vertical pipe (78) is inserted and tightly fixed in a bottom opening (76) of the passage.

13. Apparatus as in claim 1, characterized in that a battery-operated conductance measuring device (86) is placed in the housing (12), from which electrodes (90) project into the discharge passage (66).

14. Apparatus as in claim 13, characterized in that a tamping member (72) is arranged in the discharge passage (66) behind the electrodes (90).

15. Apparatus as in claim 1, characterized in that ventilation openings (48, 50) contain bacteria filters.

* * * * *